United States Patent
Gilman (10) Patent No.: US 11,148,031 B2
(45) Date of Patent: Oct. 19, 2021

(54) TACKLING RING TRAINING DEVICES AND METHODS

(71) Applicant: Marty Gilman, Inc., Gilman, CT (US)

(72) Inventor: Neil F. Gilman, Gilman, CT (US)

(73) Assignee: Marty Gilman, Inc., Gilman, CT (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 15/695,412

(22) Filed: Sep. 5, 2017

(65) Prior Publication Data

US 2018/0015346 A1    Jan. 18, 2018

Related U.S. Application Data

(63) Continuation-in-part of application No. 15/065,369, filed on Mar. 9, 2016, now abandoned.

(51) Int. Cl.
*A63B 69/34* (2006.01)
*G09B 19/00* (2006.01)

(52) U.S. Cl.
CPC ........ *A63B 69/345* (2013.01); *G09B 19/0038* (2013.01); *A63B 2209/00* (2013.01); *A63B 2243/0066* (2013.01)

(58) Field of Classification Search
CPC .............................. A63B 69/345; A63B 69/34
USPC ........................................ 473/441, 444, 445
See application file for complete search history.

(56) References Cited

U.S. PATENT DOCUMENTS

| 2,586,283 A * | 2/1952 | Delmos ................ A63B 69/345 473/444 |
| 2002/0086776 A1 | 7/2002 | Fields et al. |
| 2017/0128809 A1 | 5/2017 | Adkisson |

FOREIGN PATENT DOCUMENTS

| AU | 2004200051 A1 | 7/2005 | |
| GB | 2477525 A * | 8/2011 | .......... A63B 69/345 |
| GB | 2477525 A | 8/2011 | |
| WO | WO2014083506 A1 | 6/2014 | |

OTHER PUBLICATIONS

Rhino, Sep. 10, 2015, All pages.*
HartSport Australia, TrySaver Tackle Ring, Jul. 14, 2013, Entire video https://www.youtube.com/watch?v=8ekNy7PXAvM.*
David Murray, Wide Receiver Blocking Drills, Jul. 10, 2011, Entire video, https://www.youtube.com/watch?v=aL1vpPkA2x4.*
Goal Line Tackling Drill, Oct. 10, 2015, All pages.*
New England Foam, Oct. 26, 2015.
Rhino Tackle Bags, Sep. 10, 2015.
USPTO. Final Office Action dated Apr. 27, 2017, for related U.S. Appl. No. 15/065,369.
Fourth Declaration of Neil Gilman under 37 C.F.R. 1.132. Filed with the USPTO dated Jan. 25, 2017, in related U.S. Appl. No. 15/065,369.

(Continued)

*Primary Examiner* — John E Simms, Jr.
*Assistant Examiner* — Rayshun K Peng
(74) *Attorney, Agent, or Firm* — Winthrop & Weinstine, P.A.; Brian R. Pollack, Esq.

(57) ABSTRACT

The disclosure provides embodiments of a tackling ring and methods of use therefore that are useful for training safer techniques of football tackling.

12 Claims, 3 Drawing Sheets

(56) References Cited

OTHER PUBLICATIONS

Third Declaration of Neil Gilman under 37 C.F.R. 1.132. Filed with the USPTO dated Dec. 14, 2016, in related U.S. Appl. No. 15/065,369.
Second Declaration of Neil Gilman under 37 C.F.R. 1.132. Filed with the USPTO dated Dec. 1, 2016, in related U.S. Appl. No. 15/065,369.
First Declaration of Neil Gilman under 37 C.F.R. 1.132. Filed with the USPTO dated Oct. 9, 2016, in related U.S. Appl. No. 15/065,369.
USPTO. Non-Final Office Action dated Jul. 8, 2016, for related U.S. Appl. No. 15/065,369.
Letter dated Jul. 21, 2017, from Paul S. Auerbach, MD, MS, FACEP, MFAWM, FAAEM, Stanford University Dept. of Emergency Medicine, to the U.S. Patent and Trademark Office, and regarding Gilman Gear Roll Tackle™ Ring Products.
Gilman Gear. Invoice sent to the University of Florida, for Custom Tackling Rings (Blue), dated Jun. 11, 2015, 1 sheet.

\* cited by examiner

TACKLING RING TRAINING DEVICES AND METHODS

CROSS-REFERENCE TO RELATED APPLICATIONS

The present patent application claims the benefit of priority to and is a continuation-in-part of U.S. patent application Ser. No. 15/065,369, filed Mar. 9, 2016.

FIELD OF THE DISCLOSURE

The present disclosure relates to athletic equipment, particularly training equipment for teaching football tackling techniques.

BACKGROUND OF THE DISCLOSURE

In the game of football today, there is a huge effort to reduce and minimize the occurrence of concussions. One way to accomplish that goal, is to change the techniques of tackling. Historically, a defender made a tackle by targeting the ball carriers chest with his helmet or stopping the ball carriers movement by placing his helmet "across the bow" of the ball carrier. In either case, the person doing the tackling sustained a violent blow to the head increasing the chances of sustaining a head or neck injury including a concussion. The present disclosure provides equipment and techniques to address the deficiencies in the state of the art.

To Applicant's knowledge, in actual practice, tackling dummies have historically been stationary, such as those attached to a heavy stationary sled, or a heavy stationary dummy. There have been no tackling sleds or dummies that move at a football player.

Art does exist that was cited in the parent application to this application. For example, AU2004/20051 ("Collier") purports to use a ring shaped device for training tackling techniques. Collier's teachings are diffuse and vague, however, and are not very useful. Most notably, Collier lacks a meaningful description as to how such a device should be used, other than rolling the device and having someone try to tackle it, without describing how to tackle it, or the theory behind it. This deficiency is greatly exacerbated by Collier's apparent desire to claim a universe of ring shaped objects, with myriad alternatives that are possible in the way of inserted weights, incorporated reservoirs and fluids, variations in shape, etc. and size. For example, at page 2, Collier teaches that the device "may be substantially or partially hollow", and that it "may be at least partially filled with a liquid, a gel, a flowable solid and the like". At page 3, Collier teaches that the ring "may contain inflatable foam pockets", and that it "may be provided with a pressure release valve to enable internal air to be expelled from the wheel upon a hard tackle and/or to inflate the wheel". In Applicant's view, none of these teachings, in reality, are effective, and many of them are extremely unsafe.

In the context of the present disclosure, the "why" and "how" of using this device are really very important, particularly in the sport of American football. While Collier references American football in passing, it is clear that, in being an Australian document, Collier is principally focused on rugby, and is written from that point of view.

Collier's discussion of incorporating weights evidences a genuine lack of understanding about the safety requirements for training aids. It is absolutely forbidden to have hard parts in tackling dummies that could cause injury to a player. But, even a passing review of Collier reveals to that a player could fall on a side of one of the weighted rings disclosed therein and injure themselves via physical contact with a weight. In contrast to rugby, American football players are rather massive, and a 350 pound lineman coming down on a ring with hard spots is almost guaranteed to result in an injury that could sideline a player for a season, or even end a professional football career. To make matters worse, from pages 2-3, Collier discusses providing "attachments to be attached to or inside the wheel" which can include "weights". In at least this respect, Collier's disclosure is actually reckless, and betrays a complete lack of understanding of the proper design of field equipment, and to one of skill in the art, demonstrates that Collier is obviously an amateur that is most likely a rugby player, and not even a coach, let alone someone knowledgeable of the design of field equipment, and let alone field equipment for American style football, which has players and issues that are not present in rugby.

The state of the art was better off without Collier because Collier's teachings, as a whole, inform those of skill in the art to do things that are not safe, and that can be expected to be ineffective. As set forth below, Applicant's disclosure is narrowly focused on embodiments of tackling rings that are safe and effective, as well as on techniques for using these rings properly. In other words, Collier's teachings are so poorly informed that they actually teach away from the present disclosure.

SUMMARY OF THE DISCLOSURE

The disclosure provides embodiments of a tackling ring training device and associated methods of use that facilitate the teaching of "rugby style" tackling, but in the context of American football.

Collier's teachings are so diffuse and unfocused, and in some respects, so dangerous, so as to detract from the state of the art, rather than add to it. For example, Collier recites dimensional ranges for his device that are not even remotely realistic to an informed designer of field equipment. For example, Collier recites an outside diameter range from "50 to 300 centimeters" [page 3, line 21], or about twenty (20) inches to about one hundred and eighteen (118) inches, or about ten feet in diameter. The size of a tackling ring product should simulate the height of a football player to some extent, as with the presently disclosed embodiments. Collier teaches a range of 5-50 kg [page 3, line 27], or about 11 pounds to 110 pounds. A 110 pound ring, or likely anything over 40 pounds would be extremely difficult to roll making it impractical and very likely to cause injury. This further demonstrates that Collier is woefully ignorant of product design and the problem he is failing to solve. Collier further teaches a width range of 10-40 centimeters [page 3, line 24], or about four (4) inches to about eighteen (18) inches. Applicant has discovered that width is also an important metric. If a ring is too narrow, it does not roll well, and if it is too wide, there is excessive rolling friction that tends to slow the ring down. Moreover, the width of the device should simulate the front to back depth of a player that is to be tackled. Applicant has found that twelve inches is a preferred width because wide receivers typically have a smaller profile than the linemen that tackle them. It is respectfully submitted that Collier's broad dimensional ranges generally demonstrate an ignorance of the needs of both rugby and football. As a result, the teachings of Collier are of little to no value, and following them would likely lead to construction of a product that would lead to injury to those that use it.

A suitable device should be somewhat predictable in its movements, and not unpredictable, as Collier teaches, because the objective of the presently disclosed embodiments to teach methods of safer tackling techniques. To put it another way, to modify the device of Collier to be predictable would render it unsuitable for its intended (although misinformed) purpose of inducing unpredictable motion. This further demonstrates that Collier is deficient.

As set forth below, Applicant has discovered particular sizes, weights, dimensions and materials to provide a tackling ring product that is safe, effective, and that has proven to be massively popular among professional, college, high school, and youth American football teams. These are the best-selling product in the nearly 90-year history of Applicant's business, Marty Gilman, Inc., d/b/a Gilman Gear, and the product has been copied extensively by competitors.

Notably, in contrast to American football, in the game of rugby, the players do not wear a helmet and shoulder pads. The way tackling is taught in rugby is to focus the eyes on the "thighs" of the opponent and place the head on the "side" of the thighs, then wrap the arms around the thighs and bring the ball carrier to the ground.

Embodiments of the present disclosure are designed to teach the concept and principles of such rugby style tackling, but instead, in the context of American football. Critically, in American football, a lineman does not aim for the "thighs", as in rugby, but instead, for the "waist", such as the waist of a wide receiver. As such, rugby rings and techniques are not directly translatable to American football. Instead, the tackling rings and techniques must be modified to simulate the tackling of a player's waist, and the cross-sectional dimensions of the ring should simulate the approximate dimensions of a waist of a player. In particular, the tackling of the ring is done with the tackling player running along an intercept course that is perpendicular to the path of travel of the rolling ring. The player then wraps his arms around the annular portion of the ring with the players head to the outside of the ring. This is meant to simulate the player tackling a receiver, putting the player's head to the right of the receiver's torso. This helps "take the head out of tackling", which is of critical importance in minimizing the risk of concussions.

Moreover, embodiments of the disclosure include an oversized "donut" or ring that is unitary in structure (i.e., not modular), of isotropic composition (without weights and the like inside, but rather continuous in structure) and durable so that it can be rolled across a field (or artificial turf, or padded surface) in a predictable manner to simulate a moving target (i.e., the opposing player). The illustrative ring is made in a range of preferable sizes from an outer diameter of about 60 inches on the upper end of a preferred range to an outside diameter of about 42 inches on the lower end of the preferred range, although it will be appreciated that the ring could conceivably be slightly smaller or slightly larger in outer diameter (e.g., about 38 inches to about 68 inches in increments of one inch).

The illustrative ring is preferably made with a range of inside diameters from a upper end of about 28 inches to a lower end of about 20 inches, although it will be appreciated that the inner diameter of the ring could conceivably be slightly smaller or slightly larger in outer diameter, as desired. In a preferred embodiment, the illustrative ring can be made in a range of weights ranging from about 14 pounds to about 32 pounds, but it will again be appreciated that the weight can be lower or higher. Illustrative embodiments of the ring are preferably made in a range of thicknesses from about twelve to about sixteen inches, but it will be appreciated that other thicknesses can be suitable.

In use, the illustrated tackling ring is caused to roll across the ground to simulate a moving player. In fact, a coach can roll it in any direction, at any angle and with a variety of speeds. The coach totally controls the direction, the angle and the speed of the ring. The ring rolls on any surface whether it is grass or artificial turf. The ring doesn't require a "track" or ramp or runway. There is no assembly or set up. The ring is ready to use the moment it is removed from a shipping container.

The design of the illustrated ring facilitates teaching ideal rugby-style tackling technique, but modified appropriately for American football. Because there is a "hole" in the tackling ring, a player can shoot their arms around the radius of the ring. Because the "hole" is at a low height in comparison to the overall height of the Ring, a football player must get low pad level and hit the Ring low. Because the ring moves "at" a football player, the player must breakdown and "come to balance" and get ready to execute a tackle in a balanced stance. Because the ring is typically about 12 inches wide (or wider), it moves in a smooth straight line manner without wobbling. As a result of the dimensions and the mass of the ring, a player can wrap their arms around an object that simulates the body thickness of a football player (i.e., the waist). As preferred embodiments of the ring are made of flexible compressible material (e.g., polyether foam), when the football player tackles the Ring and falls on top of it, it will greatly facilitate a safe landing.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

DETAILED DESCRIPTION

Description will now be given of the invention with reference to the attached FIGS. 1-5. It should be understood that these figures are exemplary in nature and in no way serve to limit the scope of the invention as the invention will be defined by the claims, as interpreted by the Courts in an issued U.S. Patent.

Prior to Applicant's development of Gilman Gear's Roll Tackle™ Ring products illustrated herein, there was a long felt, but unmet need for tools to teach safer tackling techniques to football players. The need is long-felt for these products because they facilitate the teaching of tackling techniques that reduce the risk of head injury, and thus, concussions that could otherwise lead to chronic traumatic encephalopathy (CTE) over extended periods of time. Concussions have been a serious problem in football for decades. But just how serious this problem was brought to light by forensic pathologist Dr. Bennet Omalu in the 2005 timeframe. Dr. Omalu discovered, in the course of autopsies of former NFL stars Mike Webster and Terry Long (both of whom committed suicide), that Webster and Long suffered from CTE due to repeated head injuries that in turn largely resulted from tackling. This problem has in fact existed for decades, and thus the need for tools to teach safer tackling techniques that reduce the chances of such head injuries have also existed for many decades.

The Gilman Gear Roll Tackle™ Ring products solve this long-felt but heretofore unmet need because they do in fact enable the teaching of tackling techniques that reduce the opportunity for concussions during tackling in the game of football because it prevents collisions to the head in actual tackling to "keep the head out of tackling" so to speak.

Because Gilman Gear's Roll Tackle™ Ring products are so effective, Gilman Gear has experienced unprecedented commercial success in the sales of the Roll Tackle™ Ring products. These products are the most popular products in the nearly 90 year history of MGI. Since the introduction of this product by MGI, MGI has sold thousands of Roll Tackle™ Ring products, making this Gilman Gear's most popular product in its entire history.

Coaches that have purchased and used Gilman Gear's Roll Tackle™ Ring products have been incredibly enthusiastic about this product. Coaches have indicated that the dimensions and weight of the products are ideal for players of different sizes, and the unitary foam core covered by stitched fabric provides adequate cushioning for the players so as to reduce the chance of injury during practice. The dimensions of the Roll Tackle™ Ring products are just the right size for players of different sizes, and the width of twelve inches has been found to be ideal for players of all sizes. The weight of each ring is very suitable for rolling the ring as it is not too difficult to roll the rings, but the rings still have sufficient momentum to carry them across the turf to be tackled. The cushioned core promotes safe use of the ring by players, and the unitary stitched construction makes the Roll Tackle™ Rings very durable.

While Gilman Gear does advertise its Roll Tackle™ Ring products in its catalog, it does not advertise them any more frequently than any of our other products. This demonstrates that the commercial success of these products flows from the attributes of the products and how they are used (when used properly), and not due to advertising and promotion on the part of MGI.

MGI was the first company to market with a larger size ring for training football players. Its sweeping popularity has caused other companies to follow our lead, including Fisher Athletic, Rogers Athletic, and Rae Crowther. However, Gilman Gear's products have still been the "go-to" product. The evidence supports the notion that it is the dimensions and weight of the Gilman Roll Tackle™ Ring products, as well as their construction that include a unitary and flexible polyether foam ring that is encased in fabric, without the use of zippers or hook and loop fasteners (e.g., from Velcro® USA), that have resulted in its success. The soft and flexible polyether foam cushions the landing of tacklers and virtually eliminates the risk of injury.

Figure 1:
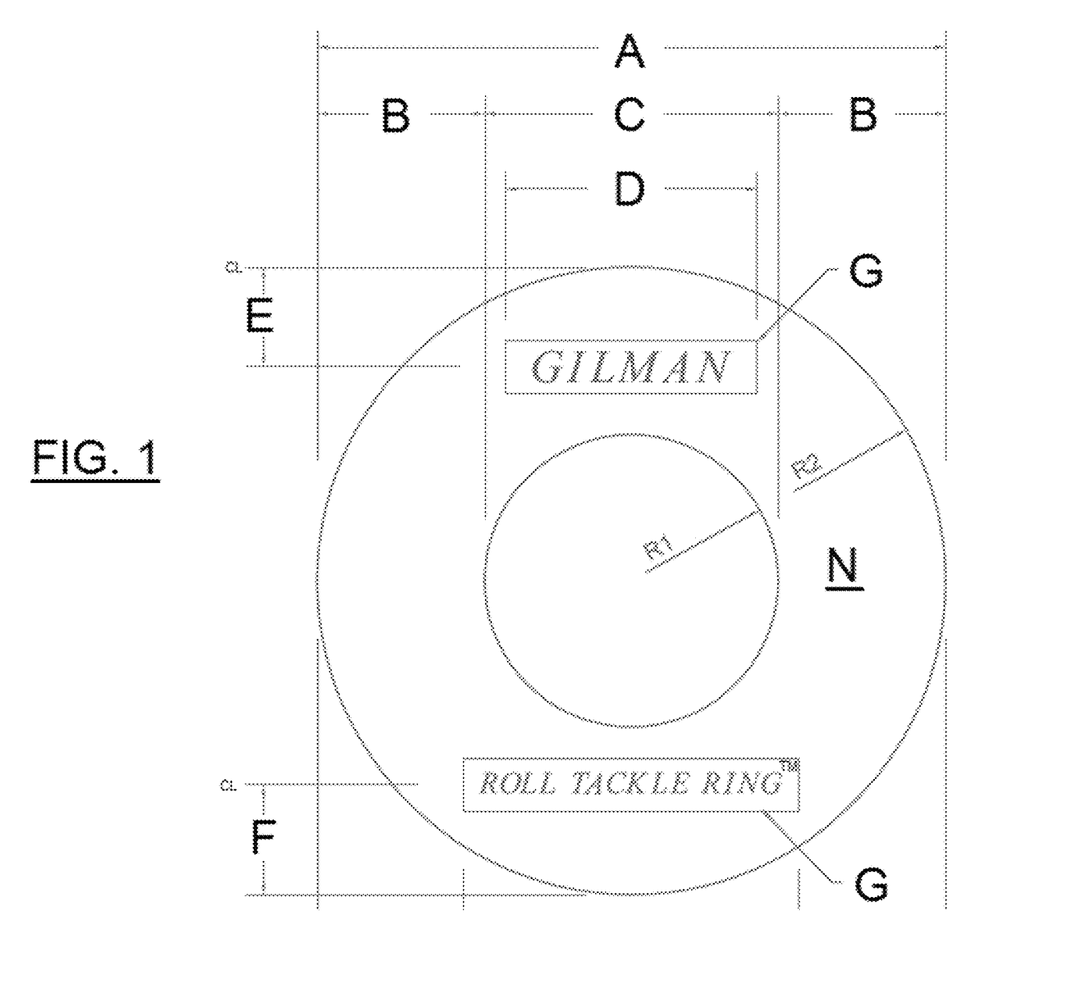
FIG. 1 is a front planar view of a device in accordance with the disclosure.

For purposes of illustration, and not limitation, as embodied herein and as illustrated in FIG. 1, an illustrative Roll Tackle™ Ring device having a toroidal structure is provided in a planform view. As illustrated, the device includes front and back annularly-shaped faces N defined by an outer diameter A (equal to twice the outer radius, R2), and an inner diameter C (equal in magnitude to twice the inner radius, R1). The maximum radial extent of the face N is equal to R2-R1, or the dimension B. If desired, indicia G may be provided on face N of any desired side. As illustrated, indicia G is provided on the embodiment of FIG. 1 having a centerline CL that is closer to the central opening of the device than the outer extend of the device. As illustrated, the device is defined by front and back annularly shaped fabric planar faces N defining a circular opening at a center thereof. The faces N are connected and intersected by inner and outer annular curved fabric planar walls O, L (respectively) to define and surround a toroidal volume. The toroidal volume is filled, preferably, with a monolithic, unitary deformable material J such as solid foam (e.g., polyether foam). During assembly, the panels of fabric are stitched together and the toroidal foam inner body J is inserted, and sealed inside by stitching. The fabric planar faces can include vinyl coated polyester or other suitable material having a basis weight between about 10 and about 24 oz. per square yard in increments of 1 oz. per square yard, more preferably between about 14 and 18 oz. per square yard. The foam body can be inserted in pieces, but is preferably unitary. The device overall is unitary in structure and must maintain its structural integrity when tackled to protect the player. Experience has shown that embodiments of the claimed invention are both safe and effective.

As illustrated in FIG. 1, the Roll Tackle™ Ring device is defined by an outer planform diameter A, an inner planform diameter C, and a thickness H defined by the distance between the front and back faces N, N. In various embodiments, the outer planform diameter can be between about 40 and 75 inches, in increments of about one inch, more preferably between about 42 inches and about 65; most preferably between about 42 inches and about 60 inches. The inner planform diameter C can be between about 10 inches and about 20 inches in increments of about one inch, more preferably between about 10 and 14 inches. The thickness H is preferably between about 10 and 20 inches in increments of about one inch, more preferably between about 12 inches and about 16 inches. The weight of the Roll Tackle™ Ring device can be between about 12 pounds and about 40 pounds, in increments of about half a pound, more preferably between about 13 pounds and about 27 pounds, with larger rings having correspondingly higher weights.

Figure 2:
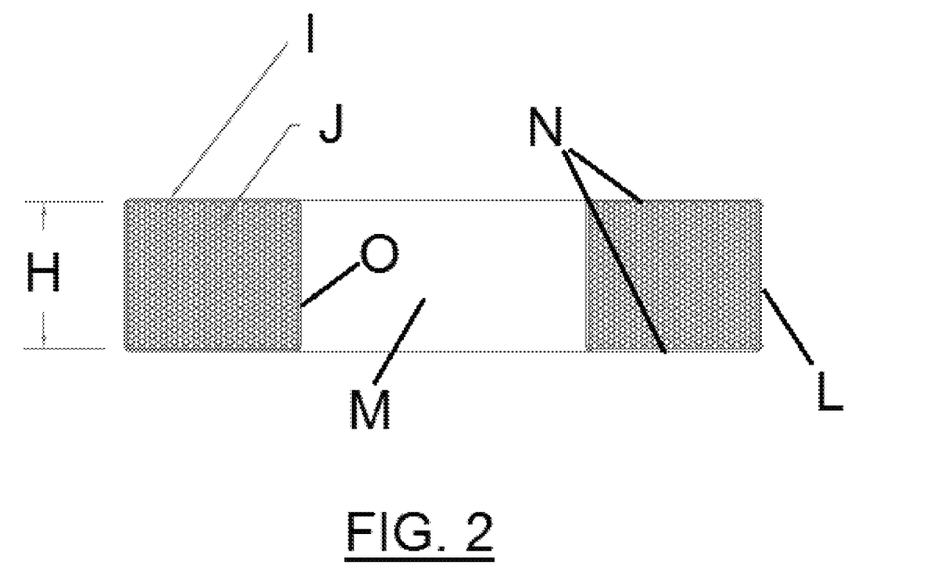
FIG. 2 is a section view through a center of the device of FIG. 1 in accordance with the disclosure.
Figure 3:
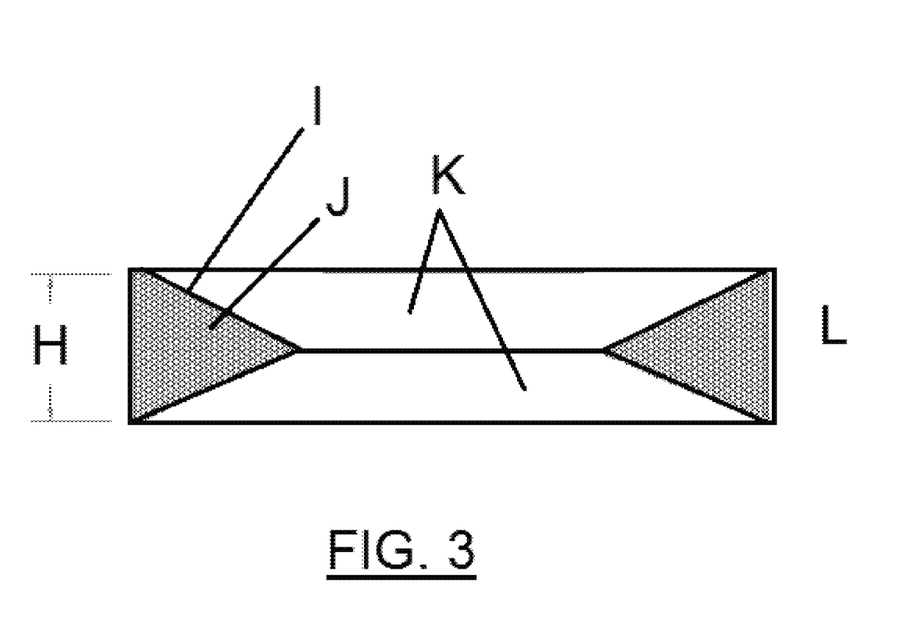
FIG. 3 is a section view through the center of a second embodiment in accordance with the disclosure.
Figure 4:
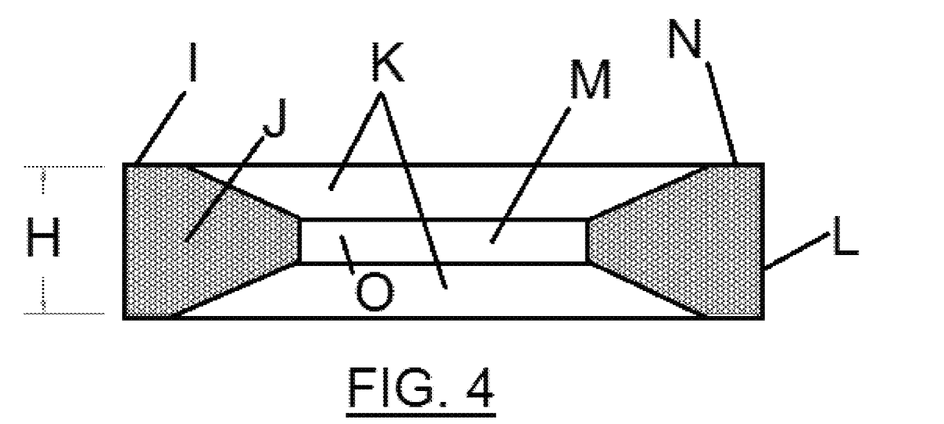
FIG. 4 is a section view through the center of a third embodiment in accordance with the disclosure.
Figure 5:
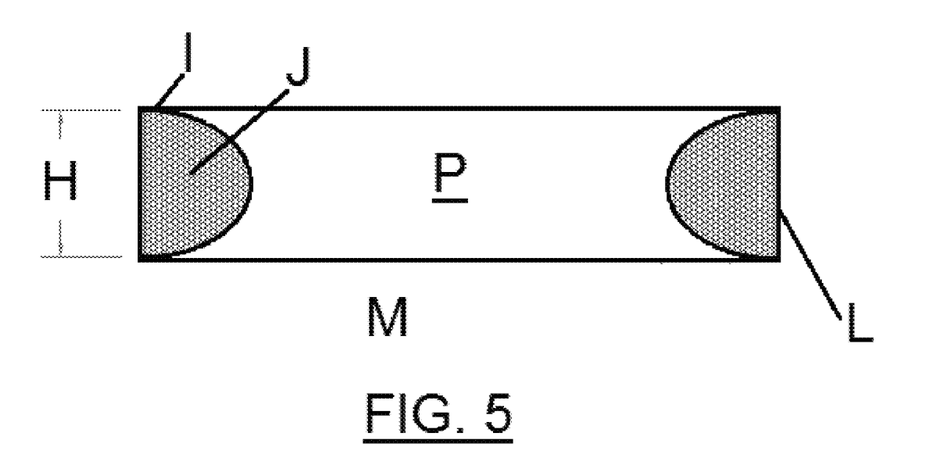
FIG. 5 is a section view through the center of a fourth embodiment in accordance with the disclosure.

As can be seen in FIG. 2, the cross section of the device is rectangular, and can be square. In alternative embodiments, however, the cross section can have different shapes. For example, as illustrated in FIG. 3, the cross section can have a triangular shape wherein faces N, N are replaced by conically shaped faces K, K, and surface O is eliminated. FIG. 4 illustrates an embodiment having a trapezoidal cross section, adding panels K, K that connect panels N, N to inner annular panel, O. FIG. 5 presents a further alternative embodiment that connects a curved inner panel (or series of attached panels) P to outer panel L. It is preferred that panel L be kept generally flat across its cross section to ensure maximum ground contact, but also to ensure that the ring will roll in a straight line when used. However, it is also contemplated that panel L could be tilted slightly such that the outer surface of the device defines a conic section so as to cause the ring to curve slightly in one direction when rolled. Moreover, instead of being flat, surface L could be slightly convex or concave, or have a non-uniform cross section (e.g., undulating or serpentine), such as a tread, as long as the device rolls as intended in use.

In use, the disclosed ring is caused to roll across the ground to simulate a moving player. In fact, a coach can roll it in any direction, at any angle and with a variety of speeds. The coach totally controls the direction, the angle and the speed of the ring. The ring rolls on any surface whether it is grass or artificial turf. The ring doesn't require a "track" or ramp or runway (although a ramp or other device could be used to help develop rotational speed and/or to "aim" the ring toward a player).

The design of the illustrated ring facilitates teaching ideal rugby tackling technique. Because there is a "hole" in the ring, a player can shoot their arms around the radius of the ring. Because the "hole" is at a low height in comparison to the overall height of the Ring, a football player must get low pad level and hit the Ring low. Because the ring can moves "at" a football player, the player must breakdown and "come to balance" and get ready to execute a tackle in a balanced stance. Because the ring is typically about 12 inches wide (or wider), it moves in a smooth straight line manner without wobbling. As a result of the dimensions and the mass of the ring, a player can wrap their arms around an object that simulates the body thickness of a football player. As preferred embodiments of the ring are made of flexible compressible material (e.g., polyether foam, memory foam and the like, when the football player tackles the Ring and falls on top of it, it will greatly facilitate a safe landing.

The foam used to make the ring preferably has a density (in lbs./ft$^3$) according to ASTM D3574-05, between about 1.0 and 1.4 lbs./ft$^3$, more preferably between about 1.15 and 1.25 lbs./ft$^3$, or any value or subrange in said ranges in increments of 0.01 lbs./ft$^3$. The foam preferably has a 25% Indentation Force Deflection (in lbs.) according to ASTM D3574-05 between about 30 and 50 lbs., more preferably between 36 and 42 lbs., or any value or subrange in said ranges in increments of 1.0 lbs. The foam preferably has a minimum tensile strength (in lbs./in$^2$) according to ASTM D3574-05 between about 8 and 15 lbs./in$^2$, such as 10, 11, or 12 lbs./in$^2$. The foam preferably has a minimum percent elongation (%) according to ASTM D3574-05 between about 100 and 120%, such as 110%. The foam preferably has a compression set @ 75% (max) according to ASTM D3574-05 between about 10 and 15, such as 11, 12, or 13. The foam preferably has a compression modulus (min) according to ASTM D3574-05 between about 1.5 and 2.3, such as about 1.6, 1.7, 1.8, 1.9 or 2.0. The foam preferably has a hysteresis loss % (max) according to ASTM D3574-05 between about 35 and 45, more preferably between 38 and 42, such as about 39, 40 or 41. The foam preferably has a resiliency % (min) according to ASTM D3574-05 between about 32 and about 38, such as about 33, 34, 35 or 36.

In some implementations, when tackling is being taught when using a ring in accordance with the disclosure, the following techniques can be particularly useful. Preferably, the coach rolls the ring as hard and as fast as possible in the course of doing drills in order to make the ring a difficult target to catch. The player preferably tackles the back half of the ring, that is to say, the half of the ring that is trailing the leading half of the ring as it moves. Most preferably, the back side bottom half of the ring is tackled, that is to say, the quadrant of the ring that is at lower left if the ring is traveling to the right, and the quadrant of the ring that is at lower right if the ring is traveling to the left. The player should keep their head to the outside trailing edge of the ring when tackling a ring that is moving across the field. Similarly, the player should keep their head to one side when tackling the ring straight on.

In accordance with a preferred method, the player should "rip", "wrap", "run" and "roll". Specifically, the player should "rip" the directional or lead forearm "hard" through the ball carrier's shin to thigh. This is simulated by aiming for the back side lower quadrant of the tackling ring and "ripping" the forearm that is on the same side of the player as the direction of travel of the ring through the hole of the ring (e.g., the right forearm if the ring is rolling to the right). The opposing, or "back side" forearm should simultaneously be "wrapped" "hard" around the outside trailing edge of the ring with the player's head to the outside of the ring, and locked up with the leading arm, and the player should then squeeze their arms. The player should meanwhile be "running" as long as they can, and when they can no longer run, "roll" the ball carrier (i.e., ring) into its "backfield" (i.e., push it over and backwards).

To help train a rugby style tackling technique for "straight on" tackling, the tackling player should slide the head to one side with the aiming point (where the tackling player is aiming with their eyes) being just above the bend of the knee of the player being tackled, with the forearm (opposite the side of the head that is being slid to the outside of the opponent) wrapping around the other side of the player being tackled. When using a tackling ring as disclosed herein straight on to simulate this tackle in practice, the player visualizes this aiming point. The tackling player should "rip" both forearms "through" the target (move them powerfully around both sides of the ring) to simulate wrapping their arms around the legs of the ball carrier being tackled, wherein the tackling player keeps their head to the outside of the ring (and thus, an opposing player) avoiding any "Head On Contact". In so doing, the player should wrap both arms, squeeze them, and "run" their feet until they "roll" the ring over in the same manner in which they would roll a player over into their backfield.

For sideline or boundary tackling, the player must maintain their point of "aim" on the "near" hip of the ball carrier, which is the hip of the ball carrier that faces the tackling player as the ball carrier runs down the side line of the field. The tackling player then "rips" their "directional" forearm (the one in the direction of travel of the ring) "through" the target (the center of the ring, in this case) at a location that is just above the knee of a simulated player being tackled, while wrapping the trailing arm, sliding the head behind the rearward edge of the ring and squeezing both arms together while the tackling player "runs" their feet as long as possible then "roll" the ball carrier, or ring, into its backfield, which in this situation forces the ball carrier out of bounds. Should a ball carrier, or the ring, cut back (away from the sideline), it will cut back into the tackling player, in which case the tackling player's directional forearm stays in front and the tackling player aims to place their head on the ball carrier's back, or trailing hip. In so doing, the tackling player's head avoids the hard contact of a knee or other head on helmet collision.

The ring can also be used to simulate Front and Backside of Zone Blocking. For Backside Cut off on Zone Blocking, the tackling player can eliminate the contact with a linebacker. This can be simulated by rolling the ring at a fast pace along the direction of travel of a defensive lineman as the defensive lineman tries to get around the offensive lineman and intercept the running back that is behind the offensive lineman. In the drill, the offensive lineman must therefore sprint to place themselves in what is known as the "cut off" or "take over" position to intercept the defensive lineman. The offensive lineman's job in this drill is to protect the running back that is presumably carrying the ball. The offensive lineman must fight to keep his head and shoulders "in front" of the defensive player so he can't make the play and sweep to the running back. The aiming point is the far knee or thigh pad of the defensive player. The offensive lineman can do this drill full speed without risking a helmet to helmet collision. For Frontside Zone Combinations, the offensive linemen can work combination blocks with the Tackling Ring serving as a down lineman, or linebacker. They can execute against stunts/movement by the defense and not take a chance on losing a player in inside drills. This is easier than a drill that involves carrying a bag or a shield.

Running Back Drills can be practiced using rings in accordance with the disclosure, including Open Field Cuts, and Goal line power drills. For Open Field Cuts, the Running Back can get great training work by avoiding one or more tackling rings that are rolled across the field. The running back must make a choice in cutting when running an "off tackle" run wherein the running back carriers the ball through a running lane, or when the running back is in a tight spot. This can be done as a safe training drill when using rings in accordance with the present disclosure. For a Goal Line Short Yardage Drill as a type of goal line power drill, a plurality of rings can be rolled side by side to force a running back to power himself into the end zone through the rings. In this drill, preferably, three rings can be rolled side by side, although more or fewer rings can be used.

Additional drills for wide receivers and running backs including perimeter blocks can also be practiced using tackling rings in accordance with the present disclosure. Running backs and wide receivers often have to work on a force corner or safety. For purposes of this disclosure, a force corner is a cornerback (CB), a member of the defensive backfield, whose job it is to cover the offensive player that is running his way by blowing up the ball carrier, or "forcing" the play back in. As is well understood, the safety (S) is also a member of the backfield. Many drills can be executed to teach arc blocking (wherein the player runs an arced path across the field) and stalk blocking with the use of tackle rings in accordance with the present disclosure. There have been many defensive backs (DB) that have had their knees badly injured by arc blocks, and many running backs have had concussions from contact in practicing the arc block.

Tackling rings in accordance with the present disclosure are a great aid in teaching the correct way to practice the perimeter blocks. For example, the wide receiver can seal off a corner back by getting him to turn either towards the sideline or towards the middle of the field. This creates a running alley for the ball carrier (e.g., running back). In so doing, the wide receiver has to make the cornerback believe that the wide receiver is lining up to receive a pass, rather than creating an opportunity for the running back. Thus, the wide receiver explodes past the line of scrimmage and lines up his direction of travel with the position of the defender. When the receiver is within a yard or two of the defender, he will break down, squatting to put his hips at a lower elevation than the defender's. Once the receiver is close to the defender, he will assure that he is under control and will mirror the movements of the defender. By mirroring the defender (similar to the technique a basketball defender uses when guarding his offensive opponent), the receiver can maintain proper body control and maintain his position between the defender and the ball carrier. Often, a slide technique is used by the receiver to position and reposition himself based on the defender's movements. This is done with a desire to turn the cornerback to the sideline or middle of the field to create the aforementioned lane for the running back. As those of skill in the art will appreciate, a tackling ring drill can be performed by rolling the ring to simulate movement of the wide receiver to help the cornerback practice. Conversely, the ring can be rolled to simulate the movement and position of the cornerback to help the wide receiver practice getting into position. While this is not a tackling drill per se, one or more rings can generally be used to simulate movement of multiple players on the field to permit an opposing player to practice a play without fear of injury arising from a hard collision. This is of particular importance, since most injuries in the game of football happen during football practice.

Various implementations of pass rush drills can be implemented for the benefit of Defensive Ends. A defensive end can use a ring to run the hoop, that is to say, perform a hoop drill. This drill is performed to develop the ability of a defensive lineman to get on the edge of an offensive player in pass protection. The Coach positions a defensive lineman one-yard outside the ring after the ring is placed flat on the ground. On the coach's command, the lineman should burst from his stance and run around the ring twice. The defensive player should concentrate on staying as close to the ring as possible. In order to stay as close to the ring as possible, the defensive lineman should try and lean into the circle as far as he can without falling. Thus, a defensive end can use the ring to run the hoop and run a tight path to get on the offensive tackle's hip. Advantageously, should the player end up falling when "leaning in", the player will land on the soft cushion of the tackling ring, and not on the hard ground or other round implement used to lay out the circle pattern.

In another implementation, stunts and games drills can be implemented for Defensive Linemen and Ends. The ring is laid flat on the ground. For a Tackle and End Stunt, align the Tackle head up with the Ring, allowing for the line of scrimmage, and align the end on the outside edge of the ring. The Tackle drives hard to the outside while hugging the ring's curvature in his path of travel. The End loops hard off the butt of the Tackle to the inside while hugging the ring in his path of travel. In an illustrative End and Tackle stunt, the End is aligned head up with the ring, again, allowing for the line of scrimmage. The Tackle is aligned on the inside edge of the Ring. The End drives hard to the inside while hugging the ring in his path of travel. The Tackle loops hard of the butt of the End to the outside while also hugging the ring in his path of travel.

The disclosed embodiments have been the subject of extensive industry praise in the form of endorsements of three (3) a professional football defensive coordinator, nine (9) endorsements of college football defensive coordinators from well-known schools with significant football programs and one high school. These are all customers of Marty Gilman, Inc. that have purchased commercial embodiments of the disclosed embodiments for use in training tackling techniques that were provided without compensation. Moreover, 17 of the existing 32 NFL teams have also purchased the Gilman Gear Roll Tackle™ Ring products. Applicant has observed that the pertinent industry—that is to say, football coaches and especially defensive coordinators of all levels (professional, college, high school, and youth), have expressed a firm belief that the Gilman Gear Roll Tackle™ Ring products are unique and innovative. (Id.). This is what has been driving the commercial success of the product.

For purposes of illustration, and not limitation, the below matrix illustrates the nexus between the industry praise received thus far and documented in the parent to the present application, and the recited features of the claims:

| Endorsement | Toroidal shape | Foam body | I.D. | Stitched fabric | 12" width | 45"φ | 48"φ | 52"φ | 60"φ |
|---|---|---|---|---|---|---|---|---|---|
| Baltimore Ravens | X | | | | X | | | X | X |
| Tampa Bay Buccaneers | | X | | | | | | X | X |
| B.C. Lions | X | X | | X | X | | X | X | X |
| Clemson U. | X | X | | | X | | | X | X |
| Virginia Tech | X | X | X | | X | | | X | X |
| U.W. Va. | X | X | | | X | | | X | X |
| Rice U. | X | X | X | | X | | | X | X |
| OSU | X | X | X | | X | X | X | X | X |
| U. Florida | X | X | X | | X | | | X | X |
| Ohio Univ. | X | | | | | | X | X | X |
| Montana St. | X | X | X | | X | | | X | |
| Georgia Tech | X | X | X | X | X | X | X | X | X |
| Shenandoah High School | X | | X | X | X | | | X | |

Further detail concerning these endorsements is provided in additional documentation submitted with the present patent application. The methods and systems of the disclosed embodiments, as described above and shown in the drawings, provide for equipment and related techniques with superior attributes. It will be apparent to those skilled in the art that various modifications and variations can be made in the devices and methods of the disclosed embodiments without departing from the spirit or scope of the disclosure. Thus, it is intended that the disclosure include modifications and variations that are within the scope of the appended claims and their equivalents.

What is claimed is:

1. A method of training football players in a goal line short yardage drill that reduces risk of concussion and other injury during football practice, comprising:
   a) providing a plurality of circular tackling ring devices, wherein each said device is defined in part by a cross sectional dimension and center height, each said ring including a toroidal structure defined by front and back annularly shaped fabric planar faces defining an opening at a center thereof, said faces being connected and intersected by inner and outer annular fabric planar walls to define and surround a toroidal volume, the toroidal volume being filled with a monolithic, unitary toroidally-shaped flexible, compressible foam body configured to cushion and protect a user that tackles the tackling ring, the tackling ring having a rectangular cross-section, wherein:
      i) each said tackling ring device is defined by an outer planform diameter, an inner planform dimension, and a thickness defined by the distance between the front and back faces;
      ii) each said outer planform diameter is between about 42 inches and about 60 inches; and
      iii) each said thickness is about 10 inches to about 20 inches; and
   b) rolling said plurality of circular tackling ring devices across a practice field in a side by side orientation toward an oncoming football running back to force the oncoming football running back participating in the drill to power themselves into an end zone through said plurality of circular tackling ring devices.

2. The method of claim 1, wherein at least one of the circular tackling ring devices is configured and arranged to be rolled on grass or artificial turf without a track, ramp or runway.

3. The method of claim 1, wherein at least one of the circular tackling ring devices has an outer planform diameter of about 60 inches and said at least one of the circular tackling ring devices has an inner planform dimension of about 28 inches to resemble the size of a football player to be tackled, and the unitary toroidally-shaped foam body is made from polyether foam and the fabric that surrounds the unitary toroidally-shaped foam body is connected by stitching to reduce the chance of injury of the practicing football player during practice.

4. The method of claim 1, wherein at least one of the circular tackling ring devices has an outer planform diameter of about 52 inches and said at least one of the circular tackling ring devices has an inner planform dimension of about 24 inches to resemble the size of a football player to be tackled, and the unitary toroidally-shaped foam body is made from polyether foam and the fabric that surrounds the unitary toroidally-shaped foam body is connected by stitching to reduce the chance of injury of the practicing football player during practice.

5. The method of claim 1, wherein at least one of the circular tackling ring devices has an outer planform diameter of about 48 inches and said at least one of the circular tackling ring devices has an inner planform dimension of about 20 inches to resemble the size of a football player to be tackled, and the unitary toroidally-shaped foam body is made from polyether foam and the fabric that surrounds the unitary toroidally-shaped foam body is connected by stitching to reduce the chance of injury of the practicing football player during practice.

6. The method of claim 1, wherein at least one of the circular tackling ring devices has an outer planform diameter of about 42 inches and said at least one of the circular tackling ring devices has an inner planform dimension of about 20 inches to resemble the size of a football player to be tackled, and the unitary toroidally-shaped foam body is made from polyether foam and the fabric that surrounds the unitary toroidally-shaped foam body is connected by stitching to reduce the chance of injury of the practicing football player during practice.

7. The method of claim 1, wherein the opening at the center of at least one of the circular tackling ring devices is circular.

8. The method of claim 1, wherein three tackling ring devices are rolled side by side to simulate the goal line short yardage drill.

9. The method of claim 1, wherein at least one of the circular tackling ring devices has an inner planform diameter between about 20 inches and about 28 inches.

10. The method of claim 1, wherein the football player tackles at least one of the circular tackling ring devices while running at full speed.

11. The method of claim 1, wherein at least two circular tackling ring devices are rolled side by side to simulate the goal line short yardage drill.

12. The method of claim 1, wherein at least three circular tackling ring devices are rolled side by side to simulate the goal line short yardage drill.

* * * * *